United States Patent [19]
Yoden et al.

[11] Patent Number: 5,112,669
[45] Date of Patent: May 12, 1992

[54] MAGNETIC RECORDING MEDIUM

[75] Inventors: Kenichi Yoden; Tadashi Yasunaga, both of Kanagawa, Japan

[73] Assignee: Fuji Photo Film Co., Ltd., Kanagawa, Japan

[21] Appl. No.: 498,517

[22] Filed: Mar. 26, 1990

[30] Foreign Application Priority Data

Mar. 31, 1989 [JP] Japan ................... 1-80498

[51] Int. Cl.5 ............................... G11B 23/00
[52] U.S. Cl. .................. 428/141; 428/336; 428/694; 428/695; 428/900
[58] Field of Search .............. 428/141, 336, 611, 678, 428/694, 695, 900

[56] References Cited

U.S. PATENT DOCUMENTS

| | | | |
|---|---|---|---|
| 4,540,618 | 9/1985 | Suzuki et al. | 428/695 |
| 4,645,703 | 2/1987 | Suzuki et al. | 428/695 |
| 4,661,418 | 4/1987 | Yanai et al. | 428/611 |
| 4,729,924 | 3/1988 | Skorjanec et al. | 428/678 |
| 4,778,707 | 10/1988 | Arioka et al. | 428/695 |
| 4,835,032 | 5/1989 | Arioka et al. | 428/695 |
| 4,968,564 | 11/1990 | Tada et al. | 428/611 |

Primary Examiner—Paul J. Thibodeau
Attorney, Agent, or Firm—Sughrue, Mion, Zinn, Macpeak & Seas

[57] ABSTRACT

A magnetic recording medium comprises a non-magnetic substrate and a thin magnetic metal layer which is overlaid on the non-magnetic substrate. The volume of pores in the thin magnetic metal layer falls within the range of 0.005 to 0.05 ml per gram of the thin magnetic metal layer.

17 Claims, 1 Drawing Sheet

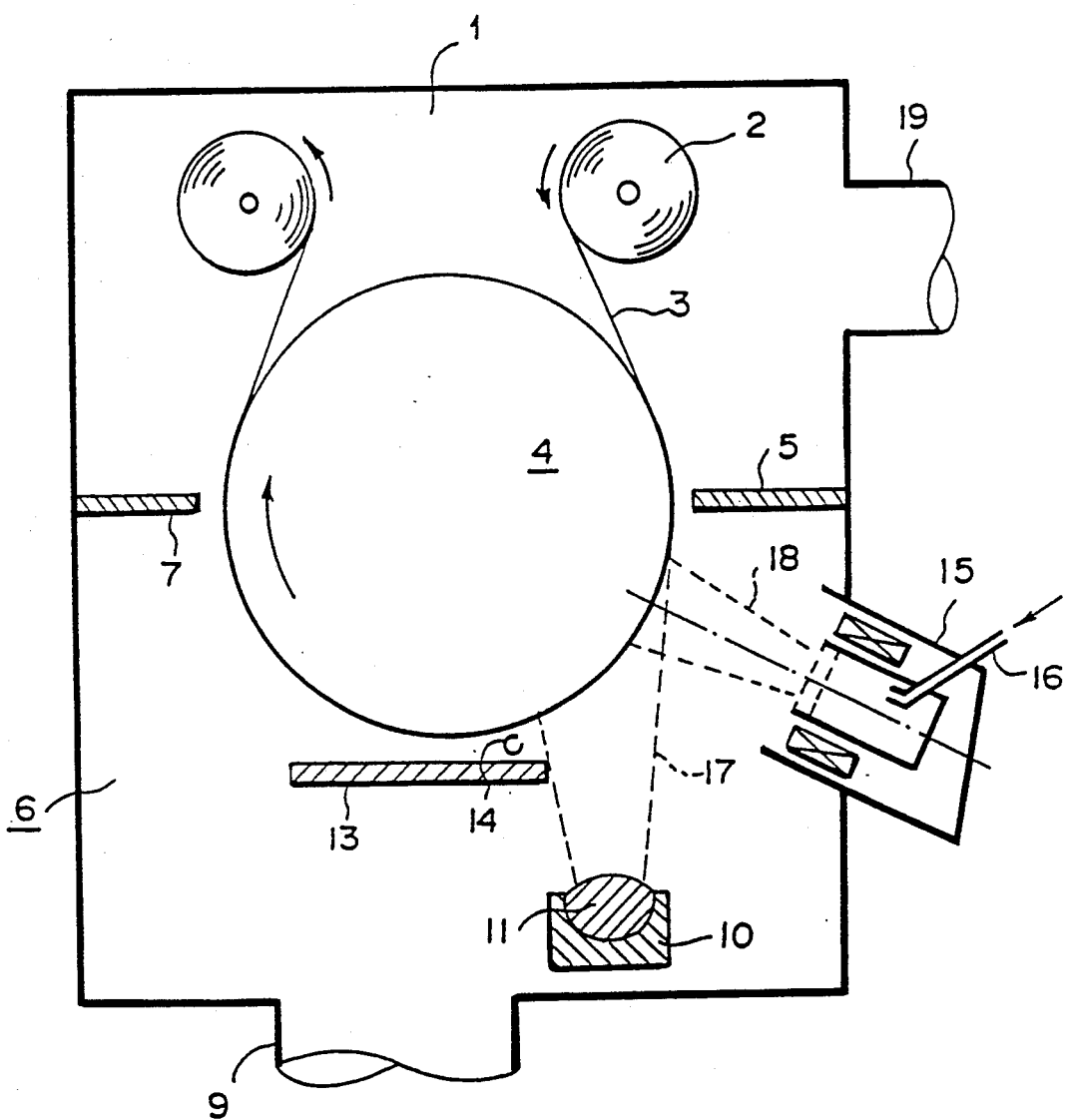

MAGNETIC RECORDING MEDIUM

BACKGROUND OF THE INVENTION

1. Field of the Invention

This invention relates to a magnetic recording medium having a thin magnetic metal layer. This invention particularly relates to a magnetic recording medium which exhibits good electromagnetic conversion characteristics and has high output power.

2. Description of the Prior Art

As media for recording and reproducing magnetic information, coated types of magnetic recording media have heretofore been used widely. These coated types of magnetic recording media have a non-magnetic substrate and a magnetic layer overlaid on the non-magnetic substrate. The magnetic layer is formed by applying a magnetic coating composition, which contains magnetic grains, a binder resin, additives, and the like, to the non-magnetic substrate and then drying it.

Presently there is a strong demand for magnetic recording media on which magnetic information can be recorded at high densities. In order to satisfy this demand, various attempts have heretofore been made to develop high energy types of magnetic recording media whose output power is high even when the recording wavelengths are short.

Research and development of high energy types of magnetic recording media ar mainly directed to the following media:

1) Coated types of magnetic recording media provided with a magnetic layer which has a smooth surface and contains magnetic metal grains exhibiting a high magnetic energy level (i.e. the so-called "metal tapes").

2) Thin metal film types of magnetic recording media provided with a thin magnetic metal layer which contains no binder resin (for example, vapor deposition tapes, which have a magnetic layer formed with a vacuum evaporation process).

The metal tapes in (1) are advantageous in that conventional apparatuses and techniques for making the coated type of magnetic recording media can be utilized. However, with these metal tapes, it is not possible to achieve high density recording with wavelengths shorter than 0.5μm and a head gap smaller than 0.25μm.

The thin film types of magnetic recording media in (2) are advantageous in that they have a high output power. For example, the output power of the thin metal film type of magnetic recording media conforming to the high-band, 8mm specifications is 6dB higher than the output power obtained with metal tapes. Additionally, the thin metal film type of magnetic recording media allows information to be recorded at high densities.

Among the thin metal film types of magnetic recording media, vapor deposition tapes are most popular. Vapor deposition tapes comprise a non-magnetic substrate and a thin magnetic metal layer which is overlaid on the non-magnetic substrate and is constituted of for example, CoNiO. Vapor deposition tapes exhibit excellent magnetic characteristics.

As described above, the thin metal film type of magnetic recording media have a higher output power than the metal tapes do. However, in response to the demand for a medium which can record information at a higher density, a thin metal film type of magnetic recording medium should be developed which has a higher output power and a higher C/N ratio.

For example, an oblique incidence vacuum evaporation process has been proposed for forming a thin magnetic metal layer exhibiting a higher coercive force (Hc). With the oblique incidence vacuum evaporation process, a stream of vapor resulting from evaporation of a magnetic material is caused to impinge upon a non-magnetic substrate in a vacuum at an oblique angle with respect to a line which is normal to the non-magnetic substrate. However, the oblique incidence vacuum evaporation process has a drawback in that the efficiency with which the magnetic material is deposited on the non-magnetic substrate is low.

Also, a novel process for forming a thin CoNiO film has been proposed wherein the oxygen content in the film is kept low so that a high saturated magnetic flux density (Bm) can be obtained. However, the proposed process has the drawback that the mechanical strength of the thin magnetic metal layer formed with the process is low.

As described above, for thin metal film types of magnetic recording media, many problems must be solved before the density at which magnetic information is recorded can be partically increased.

SUMMARY OF THE INVENTION

The primary object of the present invention is to provide a magnetic recording medium which exhibits good electromagnetic conversion characteristics and which enables magnetic information to be recorded at a high density.

Another object of the present invention is to provide a magnetic recording medium whose output power is high, particularly for video signals.

The present invention provides a magnetic recording medium comprising a non-magnetic substrate and a thin magnetic metal layer which is overlaid on the non-magnetic substrate, wherein the volume of pores in said thin magnetic metal layer falls within the range of 0.005 to 0.05 ml per gram of said thin magnetic metal layer.

With the magnetic recording medium in accordance with the present invention, the volume of pores present in the thin magnetic metal layer falls within the range of 0.005 to 0.05 ml per gram of the thin magnetic metal layer, i.e. is smaller than in conventional thin magnetic metal layers. Therefore, the density of the magnetic grains in the thin magnetic metal layer is high. Accordingly, the magnetic recording medium in accordance with the present invention exhibits a very high output power, good electromagnetic conversion characteristics, and a high C/N ratio.

BRIEF DESCRIPTION OF THE DRAWING

The Figure is a schematic view showing the major part of a vacuum evaporation apparatus for making the magnetic recording medium in accordance with the present invention.

DETAILED DESCRIPTION OF THE PREFERRED EMBODIMENT

Investigations carried out by the inventors revealed that, with conventional thin metal film types of magnetic recording media, the volume of pores in the thin magnetic metal layer is larger than 0.05 ml per gram of the thin magnetic metal layer.

With the magnetic recording medium in accordance with the present invention, the volume of pores in the thin magnetic metal layer falls within the range of 0.005 to 0.05 ml per gram of the thin magnetic metal layer, and preferably within the range of 0.01 to 0.04 ml per gram of the thin magnetic metal layer.

If the volume of the pores in the thin magnetic metal layer were larger than 0.05 ml per gram of the thin magnetic metal layer, the thin magnetic metal layer could not exhibit a high C/N ratio.

If the volume of the pores in the thin magnetic metal layer were smaller than 0.005 ml per gram of the thin magnetic metal layer, the lubricant, which should be contained in the thin magnetic metal layer, could not easily be absorbed into the thin magnetic metal layer. Therefore the durability of the thin magnetic metal layer would be unsatisfactory.

In order for the thin magnetic metal layer, in which the volume of the pores falls within the range of 0.005 to 0.05 ml per gram of the thin magnetic metal layer, to be formed efficiently on the non-magnetic substrate of the magnetic recording medium in accordance with the present invention, an ion-assisted, oblique incidence vacuum evaporation process should preferably be used.

Specifically, with the ion-assisted, oblique incidence vacuum evaporation process, a stream of vapor resulting from evaporation of a magnetic material is caused to impinge upon a non-magnetic substrate at an oblique angle of incidence, i.e. at an oblique angle with respect to a line which is normal to the non-magnetic substrate. At the same time, an ion beam is directed toward the non-magnetic substrate from a direction which is determined in association with the angle of incidence of the stream of vapor of the magnetic material.

When the thin magnetic metal layer is formed on the non-magnetic substrate with the ion-assisted, oblique incidence vacuum evaporation process, it is necessary for the ion beam to be directed to the part of the non-magnetic substrate upon which the stream of vapor of the magnetic material is impinging. The angle of incidence of the stream of vapor of the magnetic material is selected in accordance with the kind of magnetic material being used, the kind of ion being used, and the conditions under which the thin magnetic metal layer is being formed on the non-magnetic substrate (such as the temperature of the non-magnetic substrate, and the speed at which the non-magnetic substrate is moving during the formation of the thin magnetic metal layer). In order for the volume of pores in the thin magnetic metal layer to fall within the range of the present invention defined above, the angle of incidence of the stream of vapor of the magnetic material should be set appropriately, depending on the kind of magnetic material being used, the kind of ion being used, and the conditions under which the thin magnetic metal layer is being formed on the non-magnetic substrate.

It is also possible to employ an appropriate process other than the ion-assisted, oblique incidence vacuum evaporation process in order to make the magnetic recording medium of the preferred embodiment in accordance with the present invention.

Also, by way of example, a thin primary layer constituted of a material having a high melting point, such as carbon, may be overlaid on the non-magnetic substrate, and the thin magnetic metal layer may then be overlaid on the thin primary layer.

The volume of pores present in the thin magnetic metal layer of the magnetic recording medium in accordance with the preferred embodiment of the present invention can be determined with one of various appropriate methods. For this purpose, the method for determining the volume of pores from an adsorption isotherm and a desorption isotherm obtained with a nitrogen gas adsorption process is the most popular.

The thin magnetic metal layer of the magnetic recording medium in accordance with the preferred embodiment of the present invention contains cobalt (Co) as its major constituent in proportions falling within the rang of 50% by weight to 100% by weight.

By way of example, the thin magnetic metal layer of the magnetic recording medium in accordance with the preferred embodiment of the present invention may be constituted of a magnetic material selected from the group consisting of pure Co, CoNi, CoCr, CoFe, CoFeNi, CoNiCr, CoPr, CoNiPr, CoPt, CoSm, CoTi, CoNiTi, CoCu, and CoNiCu. In order to improve the characteristics of the thin magnetic metal layer, a light element such as O, N or C may also be included therein. Particularly, oxygen has the effect of increasing the strength of the thin magnetic metal layer and improving its static magnetic characteristics, especially the coercive force (Hc).

It is desirable, but not necessary that the thickness of the thin magnetic metal layer of the magnetic recording medium in accordance with the preferred embodiment of the present invention should fall within the range of $0.02\mu m$ to $2\mu m$, and preferably within the range of $0.05\mu m$ to $0.5\mu m$. If the thin magnetic metal layer is thinner than $0.02\mu m$, a sufficient output power cannot be obtained. If the thin magnetic metal layer is thicker than $2\mu m$, the magnetic recording medium might curl or the thin magnetic metal layer might crack.

In order to improve the durability of the thin magnetic metal layer of the magnetic recording medium in accordance with the preferred embodiment of the present invention, a lubricant layer and a protective layer may be overlaid on the thin magnetic metal layer.

The lubricant layer and the protective layer may be constituted of a fatty acid having 12 to 18 carbon atoms, such as oleic acid, myristic acid, or stearic acid; a metal salt of such a fatty acid; an ester of such a fatty acid; or a fluorine-substituted compound of such a fatty acid.

The lubricant layer is overlaid on the thin magnetic metal layer such that the amount of the lubricant preferably, but not necessarily falls within the rang of 3 to 30 mg per $m^2$ of the thin magnetic metal layer, and preferably within the range of 5 to 15 mg per $m^2$ of the thin magnetic metal layer. If the amount of the lubricant is larger than 30 mg per $m^2$ of the thin magnetic metal layer, the lubricant will drift locally as the magnetic recording medium travels through a video tape recorder. As a result, the output power of the magnetic recording medium will be lowered, and the magnetic recording medium will not move smoothly through the video tape recorder.

If the amount of the lubricant is smaller than 3 mg per $m^2$ of the thin magnetic metal layer, the durability of the magnetic recording medium will be low due to the considerable friction between the thin magnetic metal layer and the magnetic head over which the thin magnetic metal layer travels during the recording and reproduction of information.

In order to overlay the lubricant layer on the thin magnetic metal layer, one of various appropriate processes may be employed. For example, a solution of the lubricant may be applied to the thin magnetic metal layer and dried. Alternatively, the lubricant layer may be deposited on the thin magnetic metal layer with a vacuum evaporation process and thereafter buffed.

The non-magnetic substrate of the magnetic recording medium in accordance with the preferred embodiment of the present invention may be constituted of a plastic material such as polyethylene terephthalate, polyimide, polyamide, polyvinyl chloride, cellulose triacetate, polycarbonate, or polyethylene naphthalate.

The thin magnetic metal layer may be directly overlaid on the non magnetic substrate. Alternatively, a primary layer may be overlaid on the non-magnetic substrate, and the thin magnetic metal layer may then be overlaid on the primary layer.

The primary layer has the effect of improving the durability of the magnetic recording medium, reducing clogging of the magnetic head, and controlling the shape of the surface of the thin magnetic metal layer.

The primary layer may be constituted of a mixture of an inorganic material and an organic material.

By way of example, in order to form the primary layer, a composition, which contains fine grains of an inorganic material having a grain diameter falling within the range of $0.005\mu m$ to $0.1\mu m$, and an organic mixture may be applied on the non-magnetic substrate. The inorganic material may be selected from the group consisting of a metal oxide, such as $Al_2O_3$, $SiO_2$, $MgO$, $TiO_2$, $ZnO$, $Fe_2O_3$, $CdO$, or $NiO$; a carbonate, such as $CaCO_3$, $BaCO_3$, or $CoCO_3$; and a metal, such as Au, Ag, Fe, Ni, or Co. The organic mixture may be constituted of a polyester, such as polyethylene terephthalate, or polybutylene terephthalate; and an organic solvent, such as a mixture of dichloroacetic acid, orthochlorophenol, and tetrachloroethane.

In cases where the primary layer is interleaved between the non-magnetic substrate and the thin magnetic metal layer, it becomes possible to form the thin magnetic metal layer such that the surface thereof has small protrusions. The small protrusions contribute to an improvement in the durability of the magnetic recording medium. The density of the small protrusions falls within the range of $10^6$ to $10^8$ pieces per $mm^2$ of the surface of the thin magnetic metal layer.

Also, in order to improve certain characteristics of the magnetic recording medium related to how it acts when it travels through an apparatus, a backing layer may be overlaid on the surface of the non-magnetic substrate opposite to the surface provided with the thin magnetic metal layer. The backing layer may be formed by applying a coating composition containing a binder resin and fine grains of $CaCO_3$, carbon, or the like, dispersed in the binder resin to the non-magnetic substrate and then drying it.

The present invention will further be illustrated by the following nonlimiting examples.

EXAMPLE 1

A magnetic recording medium web in accordance with the present invention was made with a vacuum evaporation apparatus, the major part of which is shown in the accompanying drawing.

In the vacuum evaporation apparatus, a non-magnetic substrate 3 constituted of a $10\mu m$-thick, 100mm-wide polyethylene terephthalate film was delivered from a feed roll 2, which was located in a feed and wind up chamber 1. The non-magnetic substrate 3 was fed along a cooling can 4. It passed by a partition plate 5 and entered a vacuum evaporation chamber 6. Thereafter, the non-magnetic substrate 3 passed through a film forming region and by a partition plate 7. The non-magnetic substrate 3 entered the feed and wind-up chamber 1, and was wound up around a wind-up roll 8.

The vacuum evaporation apparatus was provided with evacuation pipes 9 and 19 which were connected to a vacuum pump. The vacuum evaporation chamber 6 was evacuated to a vacuum of $1 \times 10^{-5}$ Torr.

After the vacuum evaporation chamber 6 was evacuated, the non-magnetic substrate 3 was fed from the feed roll 2 in the manner described above and moved at a speed of 20m/minute along the cooling can 4. A magnetic material 11 containing 80% of Co and 20% of Ni was placed in a crucible 10 in the vacuum evaporation chamber 6 and heated with an electron beam in order to produce a stream of vapor 17 of the magnetic material. At the same time, oxygen gas was introduced from a gas inlet 14, which was located between a shield plate 13 and the cooling can 4, into the vacuum evaporation chamber 6 until the pressure in the vacuum evaporation chamber 6 reached $2 \times 10^{-4}$ Torr. Also, oxygen gas was fed through a gas feed pipe 16 into a Kaufmann type ion gun 15, and the Kaufmann type ion gun 15 was operated at an acceleration voltage of 1kV and at a ion current of 150mA in order to produce an ion beam 18. In this manner, the stream of vapor 17 of the magnetic material and the ion beam 18 were directed toward the non-magnetic substrate 3 which was moving along the cooling drum 4, and a thin magnetic metal layer was deposited on the non-magnetic substrate 3.

During the operation described above, the stream of vapor 17 of the magnetic material was directed toward the non-magnetic substrate 3 such that its angle of incidence upon the surface of the non magnetic substrate 3 ranged from 35° to 90°. Also, the ion beam 18 was directed toward the non-magnetic substrate 3 such that the angle of incidence of the middle part of the ion beam 18 upon the surface of the non-magnetic substrate 3 was 75°.

The rate with which the thin magnetic metal layer was deposited on the non-magnetic substrate 3 was set such that the resulting thickness of the thin magnetic metal layer was 2,000Å.

EXAMPLE 2

A thin magnetic metal layer was formed in the same manner as in Example 1, except that the Kaufmann type ion gun 15 was operated at an acceleration voltage of 1kV and at an ion current of 200mA.

EXAMPLE 3

A thin magnetic metal layer was formed in the same manner as in Example 1, except that the Kaufmann type ion gun 15 was operated at an acceleration voltage of 1kV and at an ion current of 250mA.

COMPARATIVE EXAMPLE 1

A thin magnetic metal layer was formed in the same manner as in Example 1, except that the Kaufmann type ion gun 15 was not used, but oxygen gas was introduced from the gas inlet 14 into the vacuum evaporation chamber 6 until the pressure in the vacuum evaporation chamber 6 reached $4 \times 10^{-4}$ Torr.

COMPARATIVE EXAMPLE 2

A thin magnetic metal layer was formed in the same manner as in Example 1, except that the Kaufmann type ion gun 15 was operated at an acceleration voltage of 1kV and at an ion current of 50mA.

After the magnetic recording medium webs were made in the manner described in Examples 1, 2, 3, and Comparative Examples 1, and 2, a backing layer having a thickness of 0.5μm was overlaid on the surface of the non-magnetic substrate 3 of each web opposite to the surface provided with the thin magnetic metal layer. In order to form the backing layer, a coating composition containing a binder resin, carbon black and alumina dispersed in the binder resin was applied to the surface of the non-magnetic substrate 3 of each magnetic recording medium web opposite to the surface provided with the thin magnetic metal layer. The coating composition thus applied was then dried. The binder resin was constituted of polyurethane and nitrocellulose.

Thereafter, a lubricant layer was overlaid on the surface of the thin magnetic metal layer of each magnetic recording medium web. For this purpose, a mixture containing oleic acid and perfluorocarboxylic acid in a weight ratio of 1:1 was applied to the surface of the thin magnetic metal layer at a rate of 10mg per $m^2$ of the surface of the thin magnetic metal layer. The mixture thus applied was then dried.

Each magnetic recording medium web was then slit into 8mm-wide pieces. In this manner, samples of magnetic recording media for 8mm video systems were obtained.

Thereafter, the samples of magnetic recording media thus obtained were loaded into 8mm video cassettes. An 8mm video tape recorder (FUJIX 8 M6-AF supplied by Fuji Photo Film Co., Ltd.) was modified and used to determine the C/N ratio of each of the samples of magnetic recording media.

During the determination of the C/N ratio, the carrier frequency was set at 7MHz and the frequency of the noise was set at 3MHz. Signals were detected with a 3585A Spectrum Analyzer supplied by Yokogawa Hewlett-Packard K.K.

Also, the volume of pores in the thin magnetic metal layer of each sample was determined with a nitrogen gas adsorption process.

Specifically, Autosorb-1 supplied by Quantachrome Co. was used in order to determine the volume of pores in the thin magnetic metal layer of each sample. A length of approximately 4m of each sample was wound up around a glass rod. Helium gas was used as the carrier gas. A mixture of nitrogen gas and helium gas was supplied, and the partial pressure of nitrogen gas (relative pressure) was gradually increased from 0 to 1. In this manner, an adsorption isotherm was determined. Thereafter, the partial pressure of nitrogen gas (relative pressure) was gradually decreased from 1 to 0, and a desorption isotherm was determined.

It was assumed that the pores in the thin magnetic metal layer of each sample were thus filled with liquid nitrogen, and the total volume of pores was determined from the amount of nitrogen adsorbed at the relative pressure of 1.

In order to determine the weight of the thin magnetic metal layer of each sample, each sample was dipped in 0.5N hydrochloric acid for two hours until the thin magnetic metal layer was dissolved. The weight of the thin magnetic metal layer of each sample was then determined from the difference in the weight of the sample before the thin magnetic metal layer was dissolved and after the thin magnetic metal layer was dissolved.

Table 1 shows the results of the determination of the volume of pores in the thin magnetic metal layer of each sample, and the C/N ratio which each sample exhibited.

TABLE 1

|  | Volume of pores per gram of the thin magnetic metal layer (ml/gr) | C/N ratio (dB) |
|---|---|---|
| Example 1 | 0.038 | −2.0 |
| Example 2 | 0.020 | +2.8 |
| Example 3 | 0.008 | +3.1 |
| Comp. Ex. 1 | 0.062 | +0.4 |
| Comp. Ex. 2 | 0.055 | 0.0 |

We claim:

1. A magnetic recording medium comprising a non-magnetic substrate, and a thin magnet layer which is overlaid on the non-magnetic substrate wherein the volume of pores in said thin magnetic metal layer falls within the range of 0.005 to 0.05 ml per gram of said thin magnetic metal layer, said thin magnetic layer having a thickness which falls within the range of 0.2 μm to 2 μm.

2. A magnetic recording medium as defined in claim 1 wherein said volume of pores in said thin magnetic metal layer falls within the range of 0.01 to 0.04 ml per gram of said thin magnetic metal layer.

3. A magnetic recording medium as defined in claim 1 wherein said thin magnetic metal layer contains cobalt as its major constituent.

4. A magnetic recording medium as defined in claim 1 wherein said thin magnetic metal layer contains cobalt in proportions falling within the range of 50% by weight to 100% by weight.

5. A magnetic recording medium as defined in claim 3 or 4 wherein said thin magnetic metal layer further contains at least one element selected from the group consisting of O, N, and C.

6. A magnetic recording medium as defined in claim 1 wherein the thickness of said thin magnetic metal layer falls within the range of 0.05μm to 0.5μm.

7. A magnetic recording medium as defined in claim 1 wherein a lubricant layer is overlaid on said thin magnetic metal layer.

8. A magnetic recording medium as defined in claim 7 wherein the amount of said lubricant falls within the range of 3 to 30 mg per $m^2$ of said thin magnetic metal layer.

9. A magnetic recording medium as defined in claim 8 wherein the amount of said lubricant falls within the range of 5 to 15 mg per $m^2$ of said thin magnetic metal layer.

10. A magnetic recording medium as defined in claim 1 wherein a primary layer is interleaved between said non-magnetic substrate and said thin magnetic metal layer.

11. A magnetic recording medium as defined in claim 10 wherein said primary layer is constituted of a mixture of an inorganic material and an organic material.

12. A magnetic recording medium as defined in claim 1 wherein the surface of said thin magnetic metal layer has protrusions formed thereon.

13. A magnetic recording medium as defined in claim 12 wherein the density of said small protrusions falls within the range of $10^6$ to $10^8$ protrusions per $mm^2$ of the surface of said thin magnetic metal layer.

14. A magnetic recording medium as defined in claim 1 wherein a backing layer is overlaid on the surface of said non-magnetic substrate opposite to the surface provided with said thin magnetic metal layer.

15. A magnetic recording medium as defined in claim 1 wherein said thin magnetic metal layer is formed with an ion-assisted, oblique incidence vacuum evaporation process.

16. A magnetic recording medium as defined in claim 15 wherein an ion beam is directed to the part of said non-magnetic substrate upon which a stream of vapor of a magnetic material impinges at a large angle of incidence.

17. A magnetic recording medium as defined in claim 1 wherein said non-magnetic substrate is constituted of a plastic material selected from the group consisting of polyethylene terephthalate, polyimide, polyamide, polyvinyl chloride, cellulose triacetate, polycarbonate, and polyethylene naphthalate.

* * * * *